Figure 1:
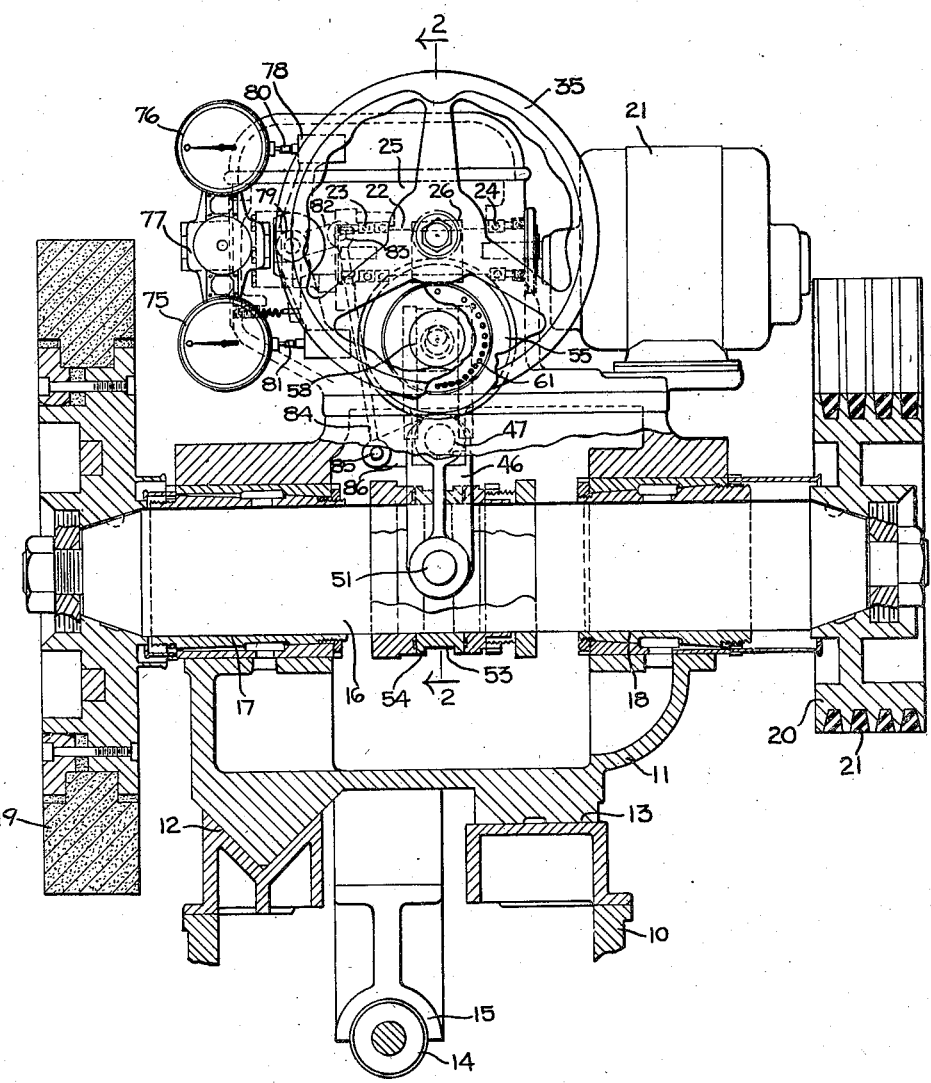

April 15, 1947.  C. G. FLYGARE ET AL  2,419,130
GRINDING WHEEL SPINDLE RECIPROCATING MECHANISM
Filed March 15, 1944  2 Sheets-Sheet 1

Inventors
CARL G. FLYGARE
CHARLES C. ALVORD

By Harold W. Eaton
Attorney

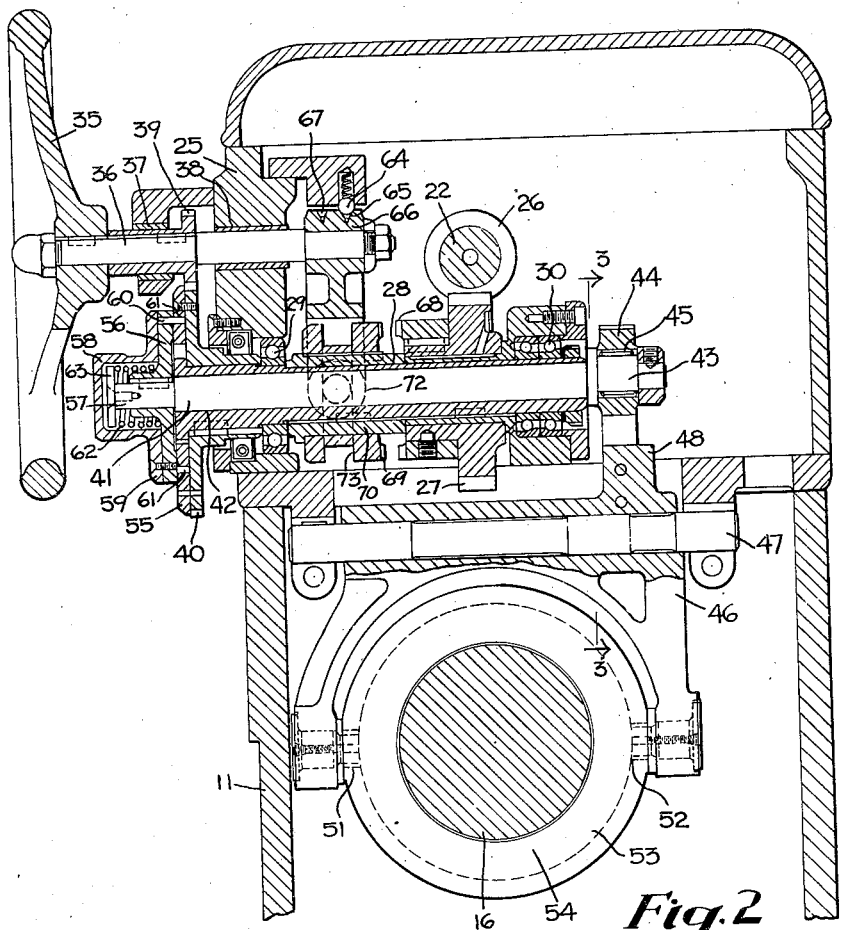
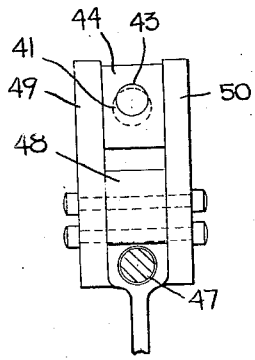

Patented Apr. 15, 1947

2,419,130

UNITED STATES PATENT OFFICE 2,419,130

GRINDING WHEEL SPINDLE RECIPROCATING MECHANISM

Carl G. Flygare and Charles C. Alvord, Worcester, Mass., assignors to Norton Company, Worcester, Mass., a corporation of Massachusetts Application March 15, 1944, Serial No. 526,528

8 Claims. (Cl. 51—34)

This invention relates to grinding machines, and more particularly to a grinding wheel spindle reciprocating and positioning mechanism.

One object of the invention is to provide a simple and thoroughly practical grinding wheel reciprocating and positioning mechanism. Another object of the invention is to provide a motor driven wheel spindle reciprocating mechanism whereby the grinding wheel spindle may be reciprocated axially within its bearings through an adjustable predetermined stroke.

Another object of the invention is to provide a motor driven wheel spindle reciprocating mechanism and a manually operable wheel spindle positioning mechanism, each being readily rendered operative so as to continuously reciprocate the spindle within its bearings or manually position the spindle within its bearings for a shoulder grinding operation.

Another object of the invention is to provide a readily accessible adjusting mechanism whereby the length of the reciprocatory stroke of the wheel spindle may be readily adjusted and varied during operation of the grinding machine. Other objects will be readily apparent from the foregoing disclosure.

The invention accordingly consists in the features of construction, combinations of elements, and arrangements of parts, as will be exemplified in the structure to be hereinafter described, and the scope of the application of which will be indicated in the following claims.

In the accompanying drawings in which is shown one of various possible embodiments of the mechanical features of this invention, Fig. 1 is a vertical sectional view through a grinding wheel slide showing the improved wheel spindle and positioning mechanism;

Fig. 2 is a fragmentary sectional view, on an enlarged scale, taken approximately on the line 2—2 of Fig. 1; and Fig. 3 is a fragmentary sectional view, on an enlarged scale, taken approximately on the line 3—3 of Fig. 2.

A grinding machine has been illustrated in the drawings having a base 10 which supports a transversely movable grinding wheel slide 11 on the usual V-way 12 and flat way 13 for a transverse feeding movement relative to a work support (not shown). A feeding mechanism is provided to impart a transverse feeding movement to the grinding wheel slide 11, comprising a rotatable feed screw 14 which is rotatably supported on the base 10. A half nut 15 depending from the under side of the wheel slide 11 meshes with or engages the feed screw 14.

The wheel slide 11 serves to support a rotatable grinding wheel spindle 16 in a pair of spaced bearings 17 and 18. A grinding wheel 19 is mounted on the left-hand end of the spindle 16 and a multi-V-groove driving pulley is mounted on the right-hand end of the wheel spindle 16. A driving mechanism, such as a motor mounted on the wheel slide 11 (not shown), may be drivingly connected by multiple V-belts 21 with the multi-V-groove pulley 20.

In order to attain one object of the invention, a motor driven wheel spindle reciprocating mechanism combined with a manually operable wheel spindle positioning mechanism is provided. An electric motor 21 is mounted on the upper surface of the wheel slide 11. The motor 21 is connected to drive a rotatable shaft 22 which is journalled in bearings 23 and 24 formed within a housing 25 mounted on top of the wheel slide 11. The shaft 22 is provided with a worm 26 which meshes with a worm gear 27. The worm gear 27 is rotatably mounted on a rotatable sleeve 28 which is journalled in anti-friction bearings 29 and 30 which are also supported in the housing 25.

In order to position the wheel spindle 16 manually in an axial direction, a manually operable hand wheel 35 is keyed on the outer end of a rotatable shaft 36 which is journalled in bearings 37 and 38. A gear 39 is also keyed to the shaft 36 and meshes with a gear 40 which is keyed to the rotatable sleeve 28. A shaft 41 is rotatably supported in an eccentric bore 42 formed within the sleeve 28. The right-hand end of the shaft 41 is provided with an eccentric portion 43 which is arranged so that it may be adjusted, if desired, so that the axis of the eccentric portion 43 coincides with the axis of rotation of the sleeve 28. A slidably mounted block 44 is supported by an anti-friction bearing 45 on the eccentric 43. A yoked member 46 is pivotally supported on a stud 47. The yoked member 46 is provided with an upwardly extending arm 48 having two parallel side plates 49 and 50 within which the slide block 44 slides. It will be readily apparent that when the sleeve 28 is rotated, it will revolve the eccentric 43 which in turn will transmit an oscillating motion through the slide block 44 to oscillate the yoked member 46. The yoked member 46 is connected to reciprocate the spindle 16 axially within its bearings 17 and 18 by a pair of diametrically opposed studs or rollers 51 and 52 which ride in a groove 53 formed in a sleeve 54 which is in turn fixedly mounted on the wheel spindle 16. It will be readily apparent from the foregoing disclosure that the grinding wheel 19 may be moved axially by manual rotation of the hand wheel 35 which transmits a rotary motion through the gears 39 and 40 and through the sleeve 28 and shaft 41 to revolve the eccentric 43 and thus impart an oscillating motion to the yoke 46 to move the wheel spindle 16 axially within its bearings 17 and 18.

It is desirable to provide a suitable connection between the sleeve 28 and the shaft 41 whereby the eccentricity of the eccentric 43 may be readily adjusted when the machine is in operation. An index plate 55 is fastened to the side face of the gear 40. A flanged member 56 is keyed to the end portion 57 of the shaft 41. A manually operable adjusting knob 58 is provided with an integral flange 59 which is fixedly mounted on the flanged member 56 by means of screws. An index stud 60 is supported by the flanged member 56 and is arranged to engage any one of a plurality of index holes 61 formed in the plate 55. As shown in Fig. 1, a portion of the flange 59, the flanged member 56 and the hand wheel 35 is broken away to clarify the illustration of the plurality of index holes 61 in the plate 55. A compression spring 62 surrounds an integral hub portion on the flange 56 and is interposed between the flange 56 and a disk 63 which is fastened to the left-hand end of the portion 57 of the shaft 41. The spring 62 normally maintains the flanged plate 56 and the knob 58 with the index stud 60 in operative engagement with one of the index holes 61 in the plate 56. As shown in Fig. 2, the parts are adjusted so that the eccentric 43 is positioned to give the maximum throw or stroke. When it is desired to adjust the length of the reciprocatory stroke of the spindle 16, the knob 58 is pulled toward the left and the knob is then rotated in a clockwise direction (Fig. 1) until the index stud 60 is opposite the desired index hole 61 in the plate 55, after which the knob 58 is released so that the released compression of the spring 62 will engage the index stud 60 to maintain the shaft 41 and eccentric 43 in the desired adjusted position relative to the sleeve 28. If it is desired to have no axial motion of the wheel spindle 16, the knob 58 may be adjusted through 180 degrees from the position illustrated in Figs. 1 and 2 so as to turn the shaft 41 and the eccentric 43 relative to the sleeve 28 so that the axis of the eccentric 43 coincides with the axis of rotation of the sleeve 28 so that when the eccentric 43 is rotated, no axial motion will be imparted to the wheel spindle 16.

In order that the manual adjustment of the wheel spindle 16 may be readily disconnected during power reciprocation thereof, the shaft 36 is arranged so that it may be moved axially to disengage the gear 39 from the gear 40. In the position illustrated in Fig. 2, a spring-pressed ball 64 is in engagement with a countersunk aperture 65 formed in the hub portion of a yoked member 66. When it is desired to disconnect the manual reciprocation of the spindle 16, the hand wheel 35 is moved toward the right (Fig. 2) so that the gear 39 is disengaged from the gear 40, in which position the spring-pressed ball 64 will engage a countersunk depression 67 formed in the hub 66.

It is desirable to provide a suitable clutch to connect and disconnect the power drive for reciprocating the wheel spindle 16 continuously and to provide an interlock between the manual control and the power reciprocation so that one of the two is maintained inoperative while the other is operative. A clutch member 68 is keyed to a hub portion formed integral with the worm gear 27. A clutch member 69 is slidably keyed on a sleeve 70 which is in turn keyed to the sleeve 28. The yoked member 66 is provided with a pair of diametrically opposed studs or rollers 72 which ride in a groove 73 formed in the clutch member 69. In the position of the hand wheel 35 (Fig. 2), a manual motion of the spindle 16 may be obtained. When it is desired to disconnect the manual motion and to connect the power reciprocation, the hand wheel 35 is moved toward the right (Fig. 2), which movement disengages the gear 39 from the gear 40 and at the same time shifts the yoked member 66 toward the right so that the clutch member 69 is thrown into engagement with the clutch member 68. In this position of the parts, a rotary motion from the motor 21 is imparted through the worm 26, the worm gear 27, through the clutch members 68—69, and through the sleeve 28 and shaft 41 continuously to revolve the eccentric 43 so as to impart a continuous oscillatory or reciprocatory motion to the yoked member 46, thereby reciprocating the spindle 16 within its supporting bearings 17 and 18.

It is desirable to provide a suitable visible indicating mechanism so that the operator may readily and precisely position the grinding wheel 19 for a shoulder grinding operation. As shown in the drawings, a pair of dial indicators 75 and 76 are supported on a bracket 77 which is mounted in a fixed position on the housing 25. A rock arm 78 is fixedly supported on a rock shaft 79. The upper end of the rock arm 78 bears against an actuating plunger 80 of the dial indicator 76. The lower end of the rock arm 78 bears against an actuating plunger 81 of the dial indicator 75. A lever 82 is fixedly mounted on the rock shaft 79 and is connected by a stud 83 with the upper end of a connecting rod 84. The lower end of the connecting rod 84 is connected by a stud 85 with an arm 86 which is fixedly supported on the rock shaft 47. It will be readily apparent from the foregoing disclosure that when the hand wheel 35 is rotated to move the wheel spindle 16 toward the right (Fig. 1), the arm 86 will be rocked in a counterclockwise direction which in turn rocks the arm 82 and the rock arm 78 in a clockwise direction to move the actuating plunger 81 of the dial indicator 75 so that a reading may be obtained on the dial indicator 75 precisely to indicate the position of the right-hand end face of the grinding wheel 19 relative to the work piece being ground. Similarly, when the wheel spindle 16 is manually moved toward the left (Fig. 1), the rock arm 78 is rocked in a counterclockwise direction so that the actuating plunger 80 is moved toward the left to give a reading on the dial indicator 76 precisely to indicate the position of the left-hand side face of the grinding wheel 19. By providing a pair of dial indicators, both indicators may be set to give a zero reading when the grinding wheel 19 is moved either toward the right or toward the left, respectively, into predetermined positions relative to shouldered portions on the work piece.

The operation of this improved wheel spindle reciprocating and positioning mechanism will be readily apparent from the foregoing disclosure. When it is desired to adjust the position of the grinding wheel 19 axially to position it relative to a shouldered portion on the work piece, the parts of the mechanism are in the position shown in Fig. 2 so that a manual rotary motion of the wheel 35 may be imparted manually to revolve the eccentric 43 to move the yoke 46 and the wheel spindle 16 axially within its bearings to position the side face of the grinding wheel relative to a shoulder on the work piece to be ground. When it is desired to impart a continuous reciprocatory movement to the wheel spindle 16 when the machine is set up for a plunge-cut grinding operation, the hand wheel 35 may be moved toward the right (Fig. 2) to disconnect the manual adjusting mechanism as above described and to connect the clutch members 69 and 68 so as to impart a continuous reciprocatory movement to the wheel spindle 16.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In a grinding machine having a rotatable axially reciprocable grinding wheel spindle, a wheel spindle reciprocating mechanism therefor including a rotatable sleeve, a shaft eccentrically supported within said sleeve, an eccentric formed integral with one end of said shaft, operative connections including a yoke between said eccentric and said spindle, means to rotate said sleeve, and means including an index mechanism including an index plate having a plurality of index holes which is fixedly mounted on said sleeve and an index plate having an index pin engageable with said holes which is slidably keyed to said shaft which serve adjustably to connect the other end of said shaft with the sleeve to facilitate varying the eccentricity of said eccentric.

2. In a grinding machine having a rotatable axially reciprocable grinding wheel spindle, a wheel spindle reciprocating mechanism therefor including a rotatable hollow sleeve, a shaft eccentrically journalled within said sleeve, an eccentric formed integral with one end of said shaft, operative connections including a yoke between said eccentric and said spindle, means to rotate said sleeve, and an indexing mechanism adjustably connecting the other end of said shaft with the sleeve including an index plate having a plurality of index holes which is fixedly mounted on said sleeve and an index plate having an index pin engageable with said holes which is slidably keyed to said shaft to facilitate varying the eccentricity of said eccentric relative to said sleeve to vary the length of the reciprocatory stroke of said spindle.

3. In a grinding machine having a rotatable axially reciprocable grinding wheel spindle, a wheel spindle reciprocating mechanism therefor including a rotatable sleeve, a shaft eccentrically supported in said sleeve, an eccentric on said shaft, operative connections including a yoke between said eccentric and said spindle, means including a manually operable hand wheel to rotate said sleeve, means including a motor driven mechanism to rotate said sleeve, and interconnecting means whereby said manual or said motor driven mechanism may be operatively connected to rotate the sleeve while the other is inoperative, and means including an index mechanism to connect said sleeve and said shaft whereby the eccentricity of said eccentric may be readily adjusted during operation of the mechanism.

4. In a grinding machine having a transversely movable wheel slide, a rotatable grinding wheel, spindle bearings on said slide, a rotatable axially reciprocable wheel spindle supported in said bearings, means including a yoked member to reciprocate said spindle axially in its bearings, a rotatable shaft having an eccentric which is arranged to oscillate said yoked member, a rotatable sleeve surrounding and supporting said shaft eccentrically relative to the axis of rotation of the sleeve, a motor driven worm and worm gear rotatably mounted on said sleeve, means including a clutch to connect said worm gear with said sleeve, a manually operable hand wheel and gearing operatively connecting said hand wheel to said sleeve, said manually operable hand wheel being arranged when moved axially in one direction to disengage said gearing and to engage said clutch so that the manually operable spindle positioning mechanism is rendered inoperative while the motor driven wheel spindle mechanism reciprocates the wheel spindle continuously.

5. In a grinding machine having a rotatable axially reciprocable grinding wheel spindle, a wheel spindle reciprocating mechanism therefor including a rotatable sleeve, a shaft eccentrically supported in said sleeve, an eccentric formed integral with one end of said shaft, operative connections including a yoke between said eccentric and spindle, means to rotate said sleeve, an index mechanism including an index plate having a plurality of holes which is fixedly supported on said sleeve, an axially movable flanged plate which is slidably keyed to one end of said shaft, an axially movable index stud supported on said flanged plate which is arranged to engage one of the index holes in said index plate to facilitate adjusting the eccentricity of said eccentric, and means including a manually operable knob to facilitate withdrawal of said index pin and rotation of the flanged plate to vary the eccentricity of said eccentric and thereby vary the length of the reciprocatory stroke of said spindle.

6. In a grinding machine having a rotatable axially reciprocable grinding wheel spindle, a wheel spindle reciprocating mechanism therefor including a rotatable sleeve, a shaft eccentrically supported in said sleeve, an eccentric formed integral with one end of said shaft, operative connections including a yoke between said eccentric and said spindle, means to rotate said sleeve, an index mechanism including an index plate having a plurality of index holes which is fixedly supported on one end of said sleeve, an axially movable flanged plate which is slidably keyed to the other end of said shaft, an axially movable pin supported on said flanged plate which is arranged to engage one of said index holes in said index plate to facilitate adjusting the eccentricity of said eccentric, a spring normally to maintain said index pin in engagement with one of said holes, and means including a manually operable knob to facilitate withdrawal of said pin and rotation of said flanged plate to vary the eccentricity of said eccentric so as to adjust the length of reciprocatory stroke of the wheel spindle.

7. In a grinding machine having a rotatable axially reciprocable grinding wheel spindle, a wheel spindle reciprocating mechanism therefor including a rotatable sleeve, a shaft eccentrically supported in said sleeve, an eccentric formed integral with one end of said shaft, operative connections including a yoke between said eccentric and said spindle, means to rotate said sleeve, an index mechanism including a plate having a plurality of index holes which is keyed to one end of said sleeve, an axially movable flanged plate which is slidably keyed to one end of said shaft, an index pin supported on said flanged plate which is arranged to engage one of the index holes in said index plate, and means including a manually operable knob to facilitate withdrawal of said index pin and rotation of said flanged plate to vary the eccentricity of said eccentric so as to facilitate adjustment of the length of the reciprocatory stroke of the wheel spindle, said index holes being arranged so that the eccentric may be adjusted from a position with its axis coinciding with the axis of rotation of the sleeve to a maximum eccentricity.

8. In a grinding machine having a rotatable axially reciprocable grinding wheel spindle, a wheel spindle reciprocating mechanism therefor including a rotatable sleeve, a shaft eccentrically supported in said sleeve, an eccentric formed integral with one end of said shaft, operative connections including a yoke between said eccentric and said spindle, means to rotate said sleeve, an index mechanism whereby said shaft may be rotarily adjusted relative to said sleeve so as to vary the eccentricity of said shaft relative to the axis of said sleeve including an index plate having a plurality of index holes which is fixedly mounted adjacent to one end of said sleeve, and an axially movable index pin which is supported in fixed relation with said shaft to facilitate adjusting the eccentricity of said eccentric to vary the reciprocatory stroke of said spindle during operation of said mechanism.

CARL G. FLYGARE.
CHARLES C. ALVORD.

REFERENCES CITED

The following references are of record in the file of this patent:

UNITED STATES PATENTS

| Number | Name | Date |
|---|---|---|
| 2,175,057 | Kearns | Oct. 3, 1939 |
| 1,470,605 | Fraser | Oct. 16, 1923 |
| 2,151,655 | Flygare | Mar. 21, 1939 |
| 2,237,496 | Muskovin | Apr. 8, 1941 |
| 2,342,854 | Garside | Feb. 29, 1944 |
| 1,659,560 | Bausch | Feb. 21, 1928 |
| 1,584,717 | Belden et al. | May 18, 1926 |
| 1,599,956 | Drew | Sept. 14, 1926 |